US012750927B2

(12) United States Patent
Hwang et al.

(10) Patent No.: US 12,750,927 B2
(45) Date of Patent: Sep. 29, 2026

(54) INDUCTION HEATING TYPE COOKTOP

(71) Applicant: LG Electronics Inc., Seoul (KR)

(72) Inventors: Seonghoon Hwang, Seoul (KR); Wontae Kim, Seoul (KR); Seongjun Kim, Seoul (KR); Seongho Son, Seoul (KR); Younghwan Kwack, Seoul (KR)

(73) Assignee: LG Electronics Inc., Seoul (KR)

( * ) Notice: Subject to any disclaimer, the term of this patent is extended or adjusted under 35 U.S.C. 154(b) by 739 days.

(21) Appl. No.: 18/032,060

(22) PCT Filed: Dec. 15, 2020

(86) PCT No.: PCT/KR2020/018316

§ 371 (c)(1),
(2) Date: Apr. 14, 2023

(87) PCT Pub. No.: WO2022/080587

PCT Pub. Date: Apr. 21, 2022

(65) Prior Publication Data

US 2023/0397305 A1 Dec. 7, 2023

(30) Foreign Application Priority Data

Oct. 16, 2020 (KR) ........................ 10-2020-0134141

(51) Int. Cl.
*H05B 6/12* (2006.01)

(52) U.S. Cl.
CPC ......... *H05B 6/1254* (2013.01); *H05B 6/1263* (2013.01); *H05B 6/1281* (2013.01); *H05B 2206/02* (2013.01)

(58) Field of Classification Search
CPC .......... H05B 6/062; H05B 6/105; H05B 6/12; H05B 6/1209; H05B 6/1236;
(Continued)

(56) References Cited

U.S. PATENT DOCUMENTS

2005/0115958 A1* 6/2005 Hoh .................... H05B 6/1263
219/620
2006/0091135 A1 5/2006 Kondo et al.
(Continued)

FOREIGN PATENT DOCUMENTS

CN 1748444 A 3/2006
CN 103582197 A 2/2014
(Continued)

OTHER PUBLICATIONS

International Search Report in International Appln. No. PCT/KR2020/018316, mailed on Jul. 1, 2021, 4 pages (with English translation).
(Continued)

*Primary Examiner* — Hung D Nguyen
(74) *Attorney, Agent, or Firm* — Fish & Richardson P.C.

(57) ABSTRACT

An induction cooktop includes: a case; a cover plate coupled to the upper end of the case and provided with an upper plate on which an object to be heated is disposed; a working coil provided inside the case; a thermal insulation material provided between the upper plate and the working coil; a first thin film provided on the lower surface of the upper plate and the inductively heated by the working coil; and a second thin film provided on the upper surface of the upper plate and contacting the object to be heated.

18 Claims, 12 Drawing Sheets

(58) Field of Classification Search
CPC .. H05B 6/1245; H05B 6/1254; H05B 6/1263; H05B 6/1272; H05B 6/1281; H05B 6/129; H05B 2206/02; H05B 2206/022
See application file for complete search history.

(56) References Cited

U.S. PATENT DOCUMENTS

| | | | | |
|---|---|---|---|---|
| 2015/0284840 | A1 | 10/2015 | Henn et al. | |
| 2016/0014851 | A1 | 1/2016 | Gough | |
| 2019/0059132 | A1* | 2/2019 | Linglin | A47J 37/105 |
| 2020/0072472 | A1 | 3/2020 | Kim et al. | |
| 2020/0288542 | A1 | 9/2020 | Jun et al. | |
| 2022/0373187 | A1 | 11/2022 | Kim et al. | |
| 2024/0295326 | A1 | 9/2024 | Kim et al. | |

FOREIGN PATENT DOCUMENTS

| | | | |
|---|---|---|---|
| JP | 2002056959 | A * | 2/2002 |
| JP | 2008-293888 | A | 12/2008 |
| JP | 2011-003412 | A | 1/2011 |
| JP | 4846374 | | 12/2011 |
| JP | 2018-137247 | A | 8/2018 |
| JP | 2018-147853 | A | 9/2018 |
| JP | 2018-532469 | | 11/2018 |
| KR | 10-2016-0055399 | A | 5/2016 |
| KR | 10-2020-0025929 | | 3/2020 |
| KR | 10-2020-0106784 | | 9/2020 |

OTHER PUBLICATIONS

Extended European Search Report in European Appln. No. 20957831.9, mailed on Oct. 25, 2024, 10 pages.

Office Action in Chinese Appln. No. 202080105208.3, mailed on Mar. 11, 2025, 11 pages (with English translation).

Office Action in Chinese Appln. No. 202080105208.3, mailed on Aug. 13, 2025, 13 pages (with English translation).

* cited by examiner

INDUCTION HEATING TYPE COOKTOP

CROSS-REFERENCE TO RELATED APPLICATIONS

This application is a National Stage application under 35 U.S.C. § 371 of International Application No. PCT/KR2020/018316, filed on Dec. 15, 2020, which claims the benefit of Korean Patent Application No. 10-2020-0134141, filed on Oct. 16, 2020.

TECHNICAL FIELD

The present disclosure relates to an induction heating type cooktop.

BACKGROUND ART

Various types of cooking equipment are used to heat food at home or in a restaurant. Conventionally, gas stoves using gas as fuel have been widely used, but recently devices for heating an object to be heated, for example, cooking vessels such as pots, have been spread using electricity instead of gas.

A method of heating an object to be heated using electricity is largely divided into a resistance heating method and an induction heating method. The electric resistance method is a method of heating an object to be heated by transferring heat generated when an electric current flows through a metal resistance wire or a non-metallic heating element such as silicon carbide to the object to be heated (for example, a cooking vessel) through radiation or conduction. In addition, when high-frequency power of a predetermined magnitude is applied to the coil, the induction heating method generates an eddy current in the object to be heated consisting of a metal component using a magnetic field generated around the coil to heat the object to be heated itself.

Recently, most of the induction heating methods are applied to cooktops.

However, in a case of a cooktop to which an induction heating method is applied, there is a limitation in that only a magnetic material can be heated. In other words, when a nonmagnetic material (for example, heat-resistant glass, pottery, or the like) is disposed on the cooktop, there is a problem that the cooktop to which the induction heating method is applied cannot heat the object to be heated.

In order to improve the problem of such an induction heating type cooktop, the present disclosure intends to use a thin film. Specifically, the cooktop according to the present disclosure may include a thin film to which an eddy current is applied so that the nonmagnetic material is heated. In addition, the thin film may be formed to have a skin depth thicker than the thickness, and accordingly, the magnetic field generated in the working coil may pass through the thin film and heat the magnetic material by applying an eddy current to the magnetic material.

When the object to be heated is a metal nonmagnetic material (e.g., aluminum), efficiency of both direct heating by the working coil and indirect heating by the thin film may be deteriorated compared to other objects due to heating characteristics of the metal nonmagnetic material.

DISCLOSURE

Technical Problem

An object of the present disclosure is to minimize the problem of deteriorating heating efficiency with respect to a metal nonmagnetic material in an induction heating type cooktop capable of heating both magnetic and nonmagnetic materials.

Technical Solution

A cooktop according to an embodiment of the present disclosure may form an open loop and include a ferromagnetic thin film that is in contact with a nonmagnetic object to be heated.

Since the cooktop according to an embodiment of the present disclosure has a double thin film structure, both magnetic and nonmagnetic materials may be heated.

Advantageous Effects

According to the present disclosure, both the magnetic and nonmagnetic materials may be heated through the same heating source, and the heating efficiency may be maximized even when the cooking vessel is the metal nonmagnetic material.

BEST MODE

Figure 1:
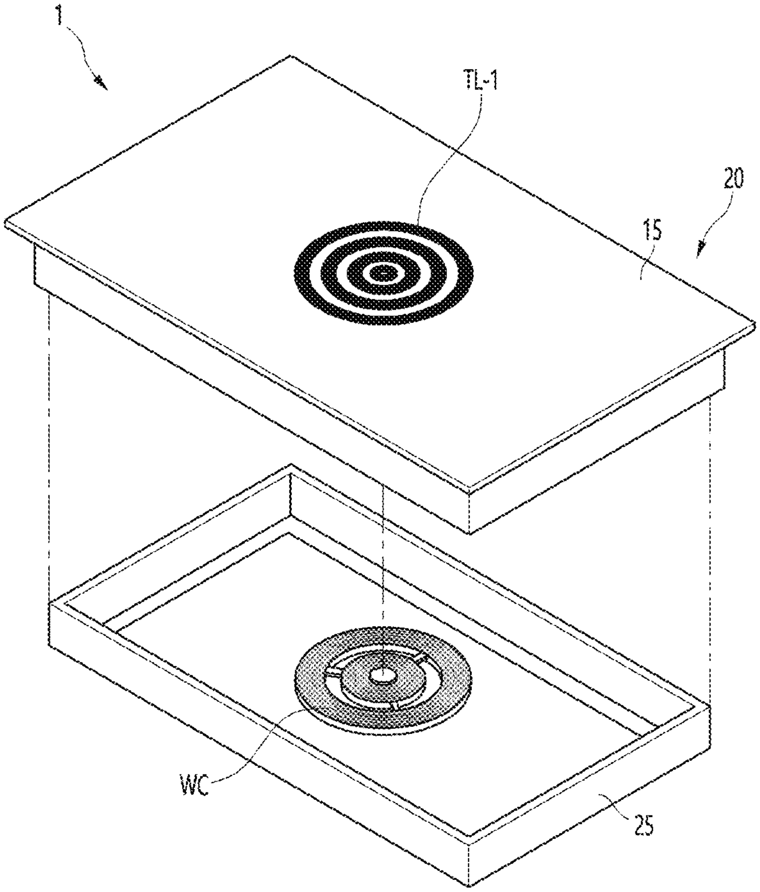
FIG. 1 is a view for explaining an induction heating type cooktop according to an embodiment of the present disclosure.

Hereinafter, preferred embodiments according to the present disclosure will be described in detail with reference to the accompanying drawings. In the drawings, the same reference numerals are used to refer to the same or similar components.

Hereinafter, an induction heating type cooktop according to an embodiment of the present disclosure will be described.

Figure 2:
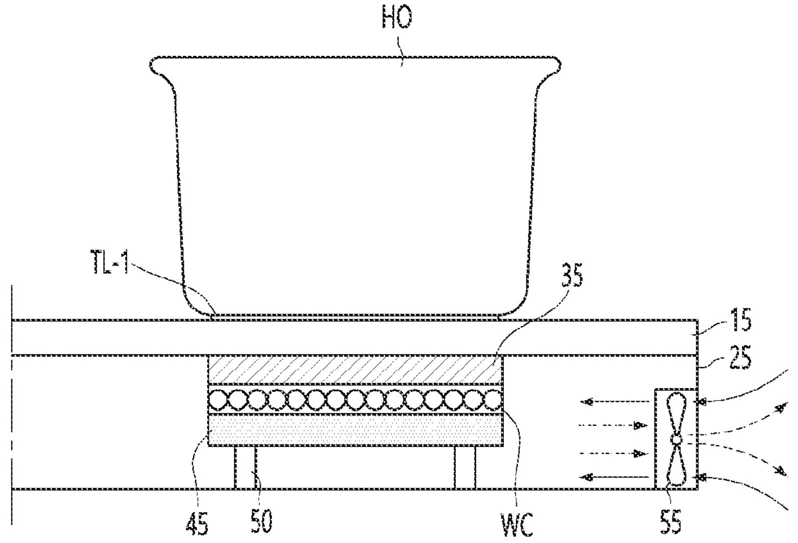
FIG. 2 is a cross-sectional view illustrating an induction heating type cooktop and an object to be heated according to a first embodiment of the present disclosure.
Figure 3:
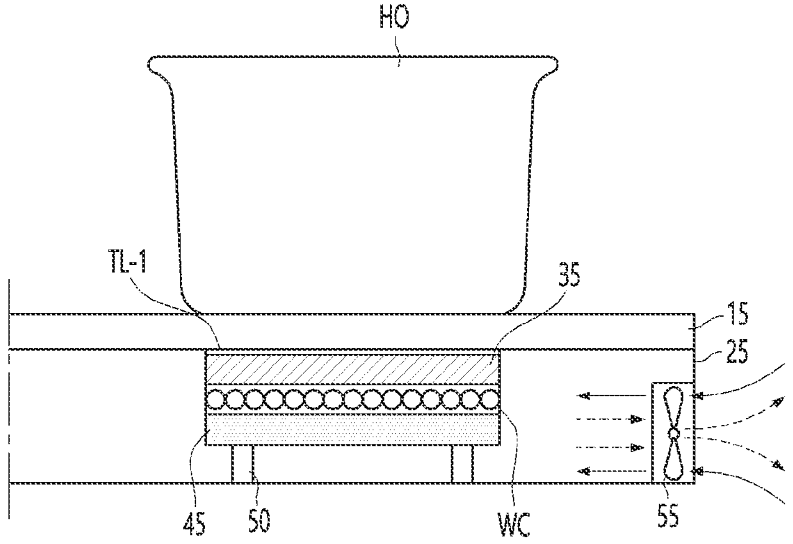
FIG. 3 is a cross-sectional view illustrating an induction heating type cooktop and an object to be heated according to a second embodiment of the present disclosure.

FIG. 1 is a view for explaining an induction heating type cooktop according to an embodiment. FIG. 2 is a cross-sectional view illustrating an induction heating type cooktop and an object to be heated according to a first embodiment of the present disclosure. FIG. 3 is a cross-sectional view illustrating an induction heating type cooktop and an object to be heated according to a second embodiment of the present disclosure.

First, referring to FIG. 1, an induction heating type cooktop 1 according to an embodiment of the present disclosure includes a case 25, a cover plate 20, a working coil WC, and a first thin film TL-1.

The working coil WC may be installed in the case 25.

For reference, various devices related to driving of the working coil (for example, a power supply that provides AC power, a rectifier that rectifies the AC power of the power supply into DC power, an inverter that converts the DC power rectified by the rectifier into resonance current through a switching operation to provides the resonance current to the working coil, a control module that controls operations of various devices within the induction heating type cooktop 1, a relay or semiconductor switch that turns on or off the working coil, etc.) in addition the working coil may be installed in the case 25, but its detailed description will be omitted.

The cover plate 20 may be coupled to an upper end of the case 25 and be provided with an upper plate 15 on which an object to be heated (not shown) is disposed on a top surface thereof.

Specifically, the cover plate 20 may include the upper plate 15 for placing an object to be heated, such as a cooking vessel, thereon.

Here, the upper plate 15 may be made of, for example, a glass material (e.g., ceramics glass).

In addition, the upper plate 15 may be provided with an input interface (not shown) that receives an input from a user to transmit the input to a control module (not shown) for an input interface. Of course, the input interface may be provided at a position other than the upper plate 15.

For reference, the input interface may be a module for inputting a desired heating intensity or driving time of the induction heating type cooktop 1 and may be variously implemented with a physical button or a touch panel. Also, the input interface may include, for example, a power button, a lock button, a power level adjustment button (+, −), a timer adjustment button (+, −), a charging mode button, and the like. In addition, the input interface may transmit the input received from the user to the control module for the input interface (not shown), and the control module for the input interface may transmit the input to the aforementioned control module (i.e., the control module for the inverter). In addition, the aforementioned control module may control the operations of various devices (e.g., the working coil) based on the input (i.e., a user input) provided from the control module for the input interface.

Whether the working coil WC is driven and the heating intensity (i.e., thermal power) may be visually displayed on the upper plate 15 in a shape of a burner. The shape of the burner may be indicated by an indicator (not shown) constituted by a plurality of light emitting devices (e.g., LEDs) provided in the case 25.

The working coil WC may be installed inside the case 25 to heat the object to be heated.

Specifically, the working coil WC may be driven by the aforementioned control module (not shown), and when the object to be heated is disposed on the upper plate 15, the working coil WC may be driven by the control module.

In addition, the working coil WC may directly heat an object to be heated (i.e., a magnetic material) having magnetism and may indirectly heat an object to be used (i.e., a nonmagnetic material) through the first thin film TL-1 that will be described later.

In addition, the working coil WC may heat the object to be heated in an induction heating manner and may be provided to overlap the first thin film TL-1 in a longitudinal direction (i.e., a vertical direction or an upward and downward direction).

For reference, although the structure in which one working coil WC is installed in the case 25 is illustrated in FIG. 1, this embodiment is not limited thereto. That is, one or more working coils may be installed in the case 25, but for convenience of explanation, in the embodiment of the present disclosure, the structure in which one working coil is installed in the case 25 will be described with an example.

The first thin film TL-1 may be applied on the upper plate 15 to heat the nonmagnetic material of the object to be heated. The first thin film TL-1 may be inductively heated by the working coil WC. Also, as the first thin film TL-1 is heated, the object to be heated may be heated by heat convection or heat conduction from the first thin film TL-1.

The first thin film TL-1 may be provided on a top surface or a bottom surface of the upper plate 15. For example, as illustrated in FIG. 2, the first thin film TL-1 may be provided on the top surface of the upper plate 15, or as illustrated in FIG. 3, the first thin film TL-1 may be provided on the bottom surface of the upper plate 15.

The first thin film TL-1 may be provided to overlap the working coil WC in the longitudinal direction (i.e., the vertical direction or the upward and downward direction). Thus, the heating of the objects to be heated may be possible regardless of the arrangement positions and types of the objects to be heated.

Also, the first thin film TL-1 may have at least one of magnetic and nonmagnetic properties (i.e., a magnetic property, a nonmagnetic property, or both the magnetic and nonmagnetic properties).

Also, the first thin film TL-1 may be made of, for example, a conductive material (e.g., silver (Ag)), and as illustrated in the drawings, a plurality of rings having different diameters may be repeatedly provided on the upper plate 15, or the first thin film TL-1 may be made of a material other than the conductive material. Also, the first thin film TL-1 may be provided in a shape other than the shape in which the plurality of rings having different diameters are repeated.

For reference, although one first thin film TL-1 is illustrated in FIG. 1, this embodiment is not limited thereto. That is, if there are a plurality of burners, a plurality of thin films may be additionally provided, but for convenience of description, one first thin film TL-1 will be described as an example.

Next, referring to FIGS. 2 and 3, the induction heating type cooktop 1 according to an embodiment of the present disclosure may further include at least some or all of a thermal insulation material 35, a shielding plate 45, a support member 50, and a cooling fan 55.

The thermal insulation material 35 may be provided between the upper plate 15 and the working coil WC.

Particularly, the thermal insulation material 35 may be mounted under the upper plate 15, and the working coil WC may be disposed below the thermal insulation material 35.

The thermal insulation material 35 may prevent heat generated while the first thin film TL-1 or the object HO to be heated by the driving of the working coil WC from being transmitted to the working coil WC.

That is, when the first thin film TL-1 or the object HO to be heated is heated by electromagnetic induction of the working coil WC, the heat of the first thin film TL-1 or the object HO to be heated may be transferred to the upper plate 15, and then, the heat of the upper plate 15 may be transferred to the working coil WC again to damage the working coil WC.

The thermal insulation material 35 may block the heat transferred to the working coil WC as described above to prevent the working coil WC from being damaged by the heat, and furthermore, prevent heating performance of the working coil WC from being deteriorated.

For reference, although it is not an essential component, a spacer (not shown) may be installed between the working coil WC and the thermal insulation material 35.

Particularly, the spacer (not shown) may be inserted between the working coil WC and the thermal insulation material 35 so that the working coil WC and the thermal insulation material 35 are not in directly contact with each other. Thus, the spacer (not shown) may prevent the heat generated while the first thin film TL-1 or the object HO to be heated by the driving of the working coil WC from being transmitted to the working coil WC through the thermal insulation material 35.

That is, since the spacer (not shown) partially shares the role of the thermal insulation material 35, a thickness of the thermal insulation material 35 may be minimized, and thus, an interval between the object HO to be heated and the working coil WC may be minimized.

In addition, the spacer (not shown) may be provided in plurality, and the plurality of spacers may be disposed to be spaced apart from each other between the working coil WC and the thermal insulation material 35. Thus, air suctioned into the case 25 by a cooling fan 55 to be described later may be guided to the working coil WC by the spacers.

That is, the spacers may guide the air introduced into the case 25 by the cooling fan 55 so as to be properly transferred to the working coil WC, thereby improving cooling efficiency of the working coil WC.

The shielding plate 45 may be mounted on the bottom surface of the working coil WC to block magnetic fields generated downward when the working coil WC is driven.

Particularly, the shielding plate 45 may block the magnetic fields generated downward when the working coil WC is driven and may be supported upward by the support member 50.

The support member 50 may be installed between a bottom surface of the shielding plate 45 and the lower plate of the case 25 to support the shielding plate 45 upward.

Particularly, the support member 50 may support the shielding plate 45 upward to indirectly support the thermal insulation material 35 and the working coil WC upward, and thus, the thermal insulation material 35 may be in close contact with the upper plate 15.

As a result, the interval between the working coil WC and the object HO to be heated may be constantly maintained.

For reference, the support member 50 may include, for example, an elastic body (e.g., a spring) for supporting the shielding plate 45 upward, but is not limited thereto. In addition, since the support member 50 is not an essential component, the support member 50 may be omitted from the induction heating type cooktop 1.

The cooling fan 55 may be installed inside the case 25 to cool the working coil WC.

Specifically, the cooling fan 55 may be controlled to be driven by the above-described control module and may be installed on a sidewall of the case 25. Of course, the cooling fan 55 may be installed at a position other than the sidewall of the case 25, but in the present disclosure, for convenience of explanation, the structure in which the cooling fan 55 is installed on the sidewall of the case 25 will be described as an example.

In addition, as illustrated in FIGS. 2 and 3, the cooling fan 55 may suction air from the outside of the case 25 to deliver the air to the working coil WC or may suction air (particularly, heated air) inside the case 25 to discharge the air to the outside of the case 25.

As a result, efficient cooling of the components (in particular, the working coil WC) inside the case 25 is possible.

Also, as described above, the air outside the case 25 delivered to the working coil WC by the cooling fan 55 may be guided to the working coil WC by the spacers. Thus, the direct and efficient cooling of the working coil WC is possible to improve durability of the working coil WC (i.e., improvement in durability due to prevention of thermal damage).

As described above, the induction heating type cooktop 1 according to an embodiment of the present disclosure may have the above-described characteristics and configuration. Hereinafter, characteristics and configuration of the first thin film described above in more detail will be described with reference to FIGS. 4 to 5.

Figure 4:
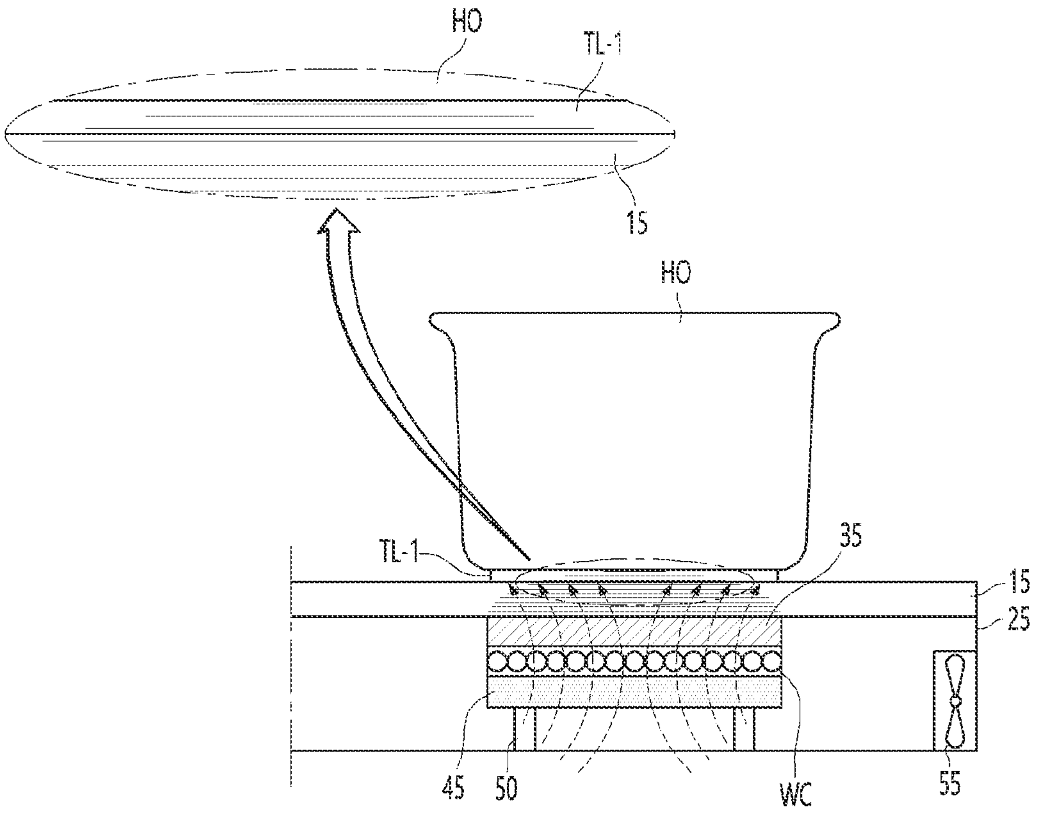
FIGS. 4 and 5 are views for explaining a relationship between a thickness and a skin depth of a first thin film.
Figure 5:
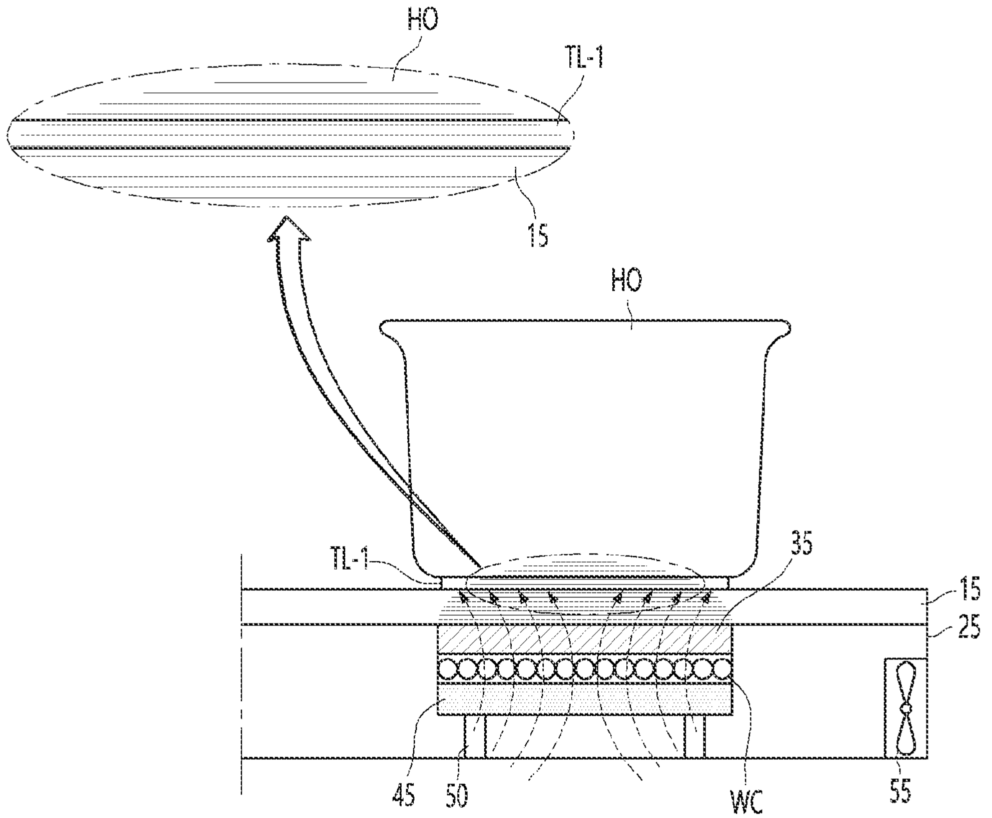

FIGS. 4 and 5 are views for explaining a relationship between a thickness and a skin depth of the first thin film.

The first thin film TL-1 may be made of a material having low relative permeability.

Particularly, since the relative permeability of the first thin film TL-1 is low, a skin depth of the first thin film TL-1 may be deep. Here, the skin depth may mean a current penetration depth from a surface of the material, and the relative permeability may be inversely proportional to the skin depth. Thus, as the relative permeability of the first thin film TL-1 decreases, the skin depth of the first thin film TL-1 increases.

Also, the skin depth of the first thin film TL-1 may be thicker than the thickness of the first thin film TL-1. That is, the first thin film TL-1 may have a thin thickness (e.g., 0.1 μm to 1,000 μm thickness), and the skin depth of the first thin film TL-1 may be deeper than the thickness of the first thin film TL-1. As a result, as the magnetic fields generated by the working coil WC passes through the first thin film TL-1 and are transmitted to the object HO to be heated, eddy current may be induced in the object HO to be heated.

That is, as illustrated in FIG. 4, when the skin depth of the first thin film TL-1 is shallower than the thickness of the thin film TL, it may be difficult to allow the magnetic fields generated by the working coil WC to reach the object HO to be heated.

However, as illustrated in FIG. 5, when the skin depth of the first thin film TL-1 is greater than the thickness of the first thin film TL-1, the magnetic fields generated by the working coil WC may reach the object HO to be heated. That is, in an embodiment of the present disclosure, since the skin depth of the first thin film TL-1 is greater than the thickness of the first thin film TL-1, the magnetic fields generated by the working coil WC may pass through the first thin film TL-1 and then be mostly transferred to the object HO to be heated and thus may be consumed. As a result, the object HO to be heated may be mainly heated.

Since the first thin film TL-1 has a thin thickness as described above, the first thin film TL-1 may have a resistance value that may be heated by the working coil WC.

Particularly, the thickness of the first thin film TL-1 may be inversely proportional to the resistance value (i.e., surface resistance value) of the first thin film TL-1. That is, as the thickness of the first thin film TL-1 applied on the upper plate 15 is thinner, the resistance value (i.e., surface resistance value) of the first thin film TL-1 may increase, and thus, the first thin film TL-1 may be thinly applied on the upper plate 15 and be changed in characteristic to loads that may be heated.

For reference, the first thin film TL-1 may have, for example, a thickness of 0.1 μm to 1,000 μm, but is not limited thereto.

Through the above-described embodiment, the induction heating type cooktop 1 according to the present disclosure may include the first thin film TL-1 to heat the object to be heated HO regardless of whether the object HO has magnetic properties.

However, when the induction heating type cooktop 1 includes only the first thin film TL-1, heating performance may vary depending on the characteristics of the object to be heated HO disposed on the upper plate 15.

For example, when the heated object HO is a metal ferromagnetic material (e.g., stainless steel 430), when the heated object HO is a non-metal nonmagnetic material (e.g., glass), and when the object HO to be heated is a metal nonmagnetic material (e.g., aluminum), all the heating performance may be different from each other.

Particularly, when the object to be heated HO is the metal nonmagnetic material (e.g., aluminum), all efficiency of the direct heating by the working coil WC and the indirect heating by the first thin film TL-1 may be deteriorated compared to other objects due to the heating characteristics of the metal nonmagnetic material.

That is, when the object to be heated HO is a metal nonmagnetic (e.g., aluminum) container, heating efficiency of the object HO to be heated may be deteriorated.

To solve this problem, the induction heating type cooktop 1 according to the present disclosure may further include a second thin film TL-2.

For reference, in this specification, the ferromagnetic material may mean an object strongly magnetized in a direction of an external magnetic field, and the nonmagnetic material may mean an object weakly magnetized in the direction of the external magnetic field. The ferromagnetic material may be iron, cobalt, nickel, or an alloy thereof, and the nonmagnetic material may be aluminum, copper, manganese, or an alloy thereof, but these are merely examples.

Next, with reference to FIG. 6, an arrangement of the second thin film TL-2 according to the present disclosure will be described in more detail.

Figure 6:
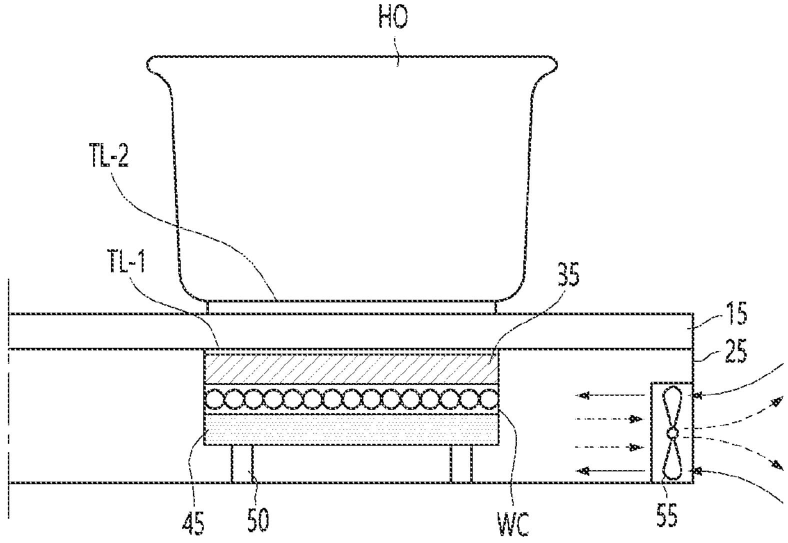
FIG. 6 is a cross-sectional view illustrating an induction heating type cooktop and an object to be heated according to a third embodiment of the present disclosure.

FIG. 6 is a cross-sectional view illustrating an induction heating type cooktop and an object to be heated according to a third embodiment of the present disclosure.

As illustrated in FIG. 6, an induction heating type cooktop 1 according to the present disclosure includes a first thin film TL-1 disposed on a bottom surface of an upper plate 15 and a second thin film TL-disposed on a top surface of the upper plate 15. A thickness of the second thin film TL-2 may be 1T (or 1 mm), but this is merely an example.

The first thin film TL-1 and the second thin film TL-2 may be provided to overlap each other in a vertical direction (i.e., a vertical direction or an upward and downward direction) with the upper plate 15 therebetween. A working coil WC may be provided to overlap the first thin film TL-1 and the second thin film TL-2 in a horizontal direction (i.e., the vertical direction or the upward and downward direction).

The second thin film TL-2 may be disposed on the top surface of the upper plate 15 so that one surface is in contact with an object HO to be heated, and the second thin film TL-2 may be made of a ferromagnetic material (e.g., stainless steel 430).

When the second thin film TL-2, which is a ferromagnetic material, is in contact with the object to be heated HO, which is a metal nonmagnetic material, heating characteristics of the object HO to be heated may be changed. For example, when the ferromagnetic second thin film TL-2 is in contact with the object to be heated HO, the heating characteristics of the object to be heated HO may be changed so that an amount of magnetic fields induced in the object HO increases.

Thus, the working coil WC according to the present disclosure may inductively heat the object to be heated HO, which is the metal nonmagnetic material, that is in contact with the second thin film TL-2.

However, when the second thin film TL-2 is made of the ferromagnetic material, an induced magnetic field to be transferred to the object to be heated HO may be transmitted to the second thin film TL-2 according to the shape and thickness of the second thin film TL-2 to heat the second thin film TL-2, thereby deteriorating the heating efficiency of the object to be heated HO.

Thus, the induction heating type cooktop 1 according to the present disclosure may include the second thin film TL-2 having a shape to minimize self-heating. Next, with reference to FIGS. 7 to 11, various embodiments in shape of the second thin film TL-2 according to the present disclosure will be described.

FIGS. 7 to 11 are views illustrating a shape of the second thin film according to an embodiment of the present disclosure.

Figure 7:
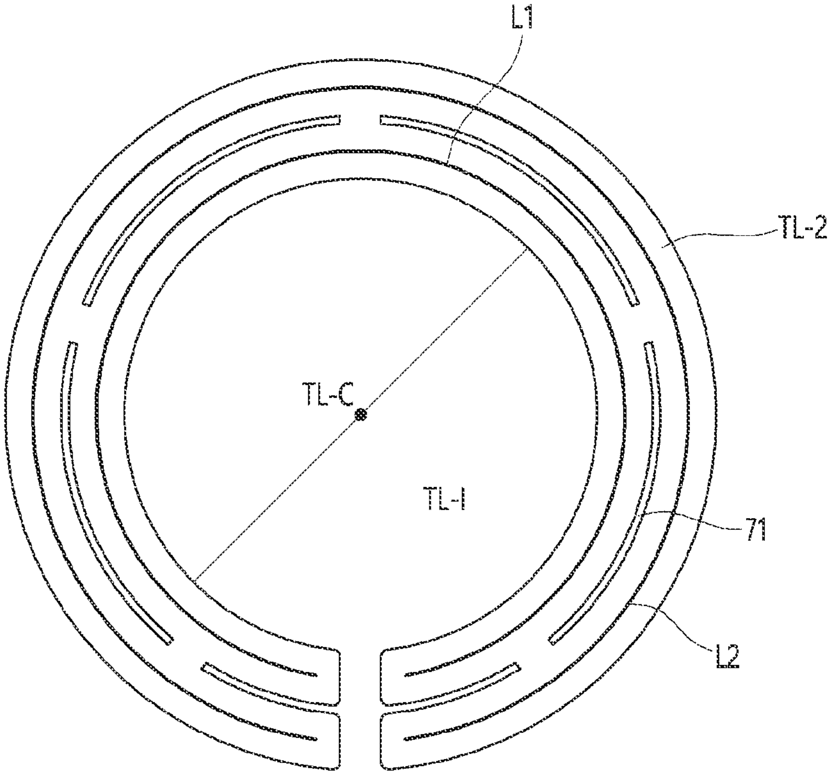
FIGS. 7 to 11 are views illustrating a shape of a second thin film according to an embodiment of the present disclosure.

Referring to FIG. 7, the second thin film TL-2 may have a shape including one or more circular open loops L1 and L2. Each of the circular open loops L1 and L2 may have a circular shape with an empty center and one side disconnected. The circular open loops L1 and L2 may be concentric circles having the same center and different only in diameter. Also, the circular open loops L1 and L2 having different diameters may be connected to each other.

The second thin film TL-2 may not include a central area TL-I of the second thin film TL-2. The central area TL-I of the second thin film TL-2 may mean an area up to a predetermined distance from each of a center TL-C of the second thin film TL-2 and a center TL-C of the second thin film TL-2 and also may mean an area vertically overlapping a central area of the working coil WC. The center area of the working coil WC may mean an area up to a predetermined distance from each of a center WC-C (see FIG. 12) of the working coil WC and a center WC-C (see FIG. 12) of the working coil WC.

When the second thin film TL-2 includes the central area TL-I of the second thin film TL-2, the central area TL-I may overlap the central area of the working coil WC, and thus, the induced magnetic field coupled to the second thin film TL-2 may increase. When the induced magnetic field coupled to the second thin film TL-2 increases, a degree of heating of the second thin film TL-2 may increase, and the heating efficiency of the object to be heated HO may be deteriorated. Thus, the second thin film TL-2 according to the present disclosure may not include the central area TL-I of the second thin film TL-2.

In addition, in the circular open loops L1 and L2, each of which one side of the second thin film TL-2 is disconnected, when eddy current flows in the second thin film TL-2 by the induced magnetic field, the second thin film TL-2 may be prevented from flowing in a closed loop.

That is, since the second thin film TL-2 according to the present disclosure has an open loop shape with an empty center, the induction heating by the working coil WC may be minimized.

In addition, the second thin film TL-2 may form at least one slit 71, which is an empty space, to minimize the flow of the eddy current, and the slit 71 may prevent the second thin film TL-2 from being deformed by heat.

Figure 8:
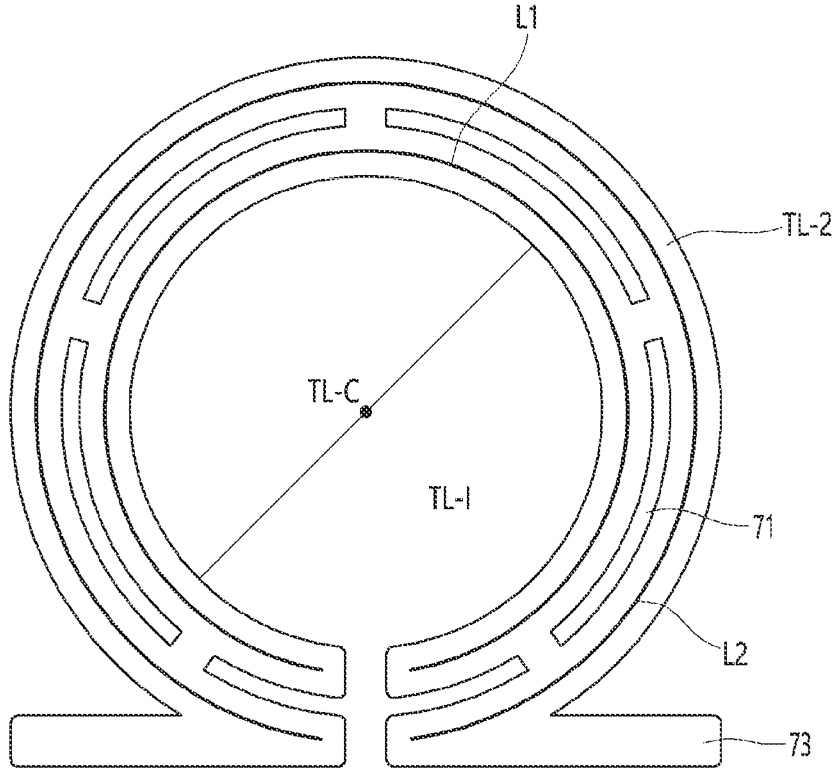

Next, referring to FIG. 8, the second thin film TL-2 according to the present disclosure may further include a protrusion 73 at one side thereof. The protrusion 73 of the second thin film TL-2 may serve as a handle so that a user easily grips the second thin film TL-2.

Figure 9:
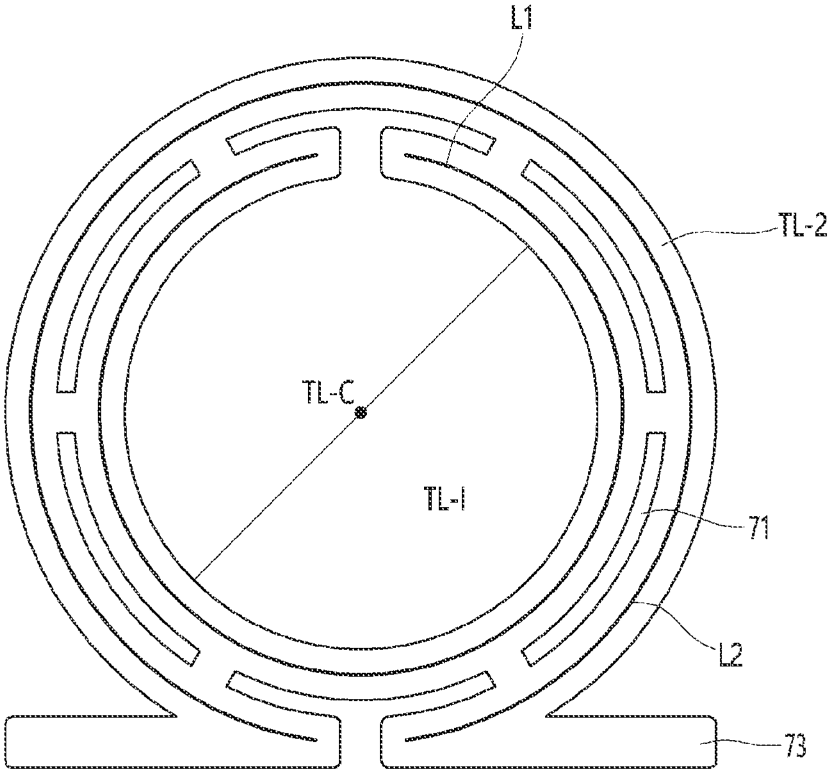

Next, referring to FIG. 9, the second thin film TL-2 according to the present disclosure may include a plurality of circular open loops L1 and L2 with one side disconnected, and the disconnected portions may be disposed opposite to each other. That is, the first open loop L1 may be configured so that one side in a 12 o'clock direction is disconnected, and the second open loop L2 may be configured so that one side in a 6 o'clock direction is disconnected.

Figure 10:
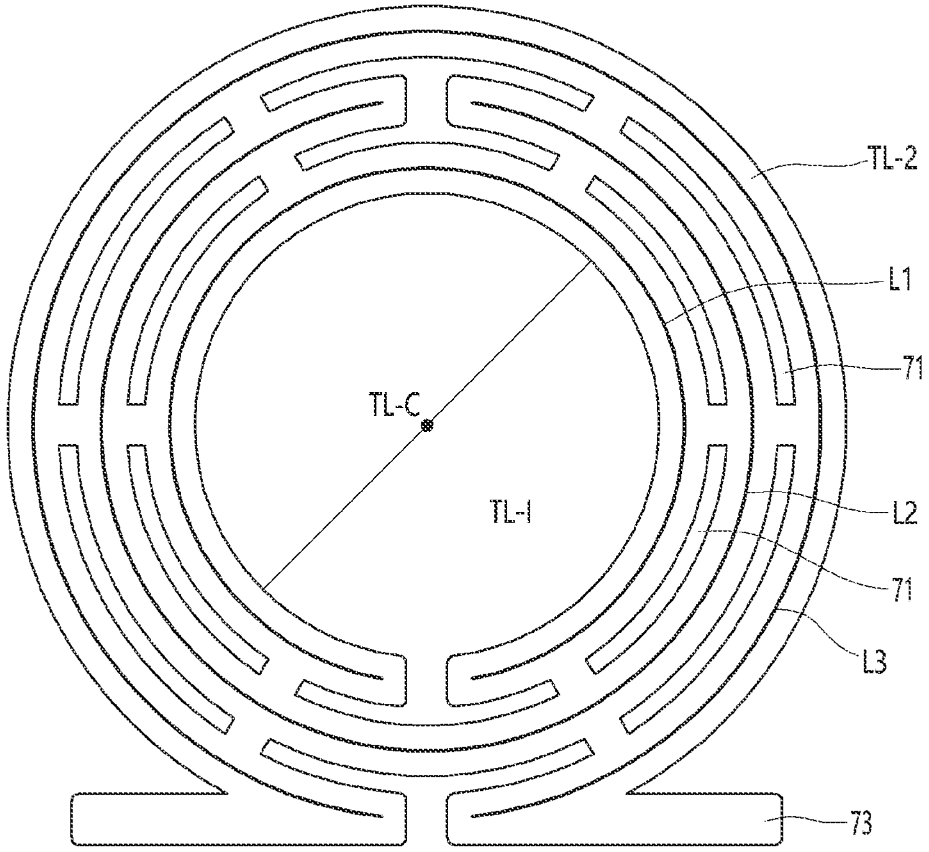

In the same principle, referring to FIG. 10, the second thin film TL-2 according to the present disclosure may include a first open loop L1 having a first diameter with one side that is connected in the 6 o'clock, a second open loop L1 having a second diameter with one side that is disconnected in the 12 o'clock, and a third open loop L3 having a third diameter with one side that is disconnected in the 6 o'clock direction.

Figure 11:
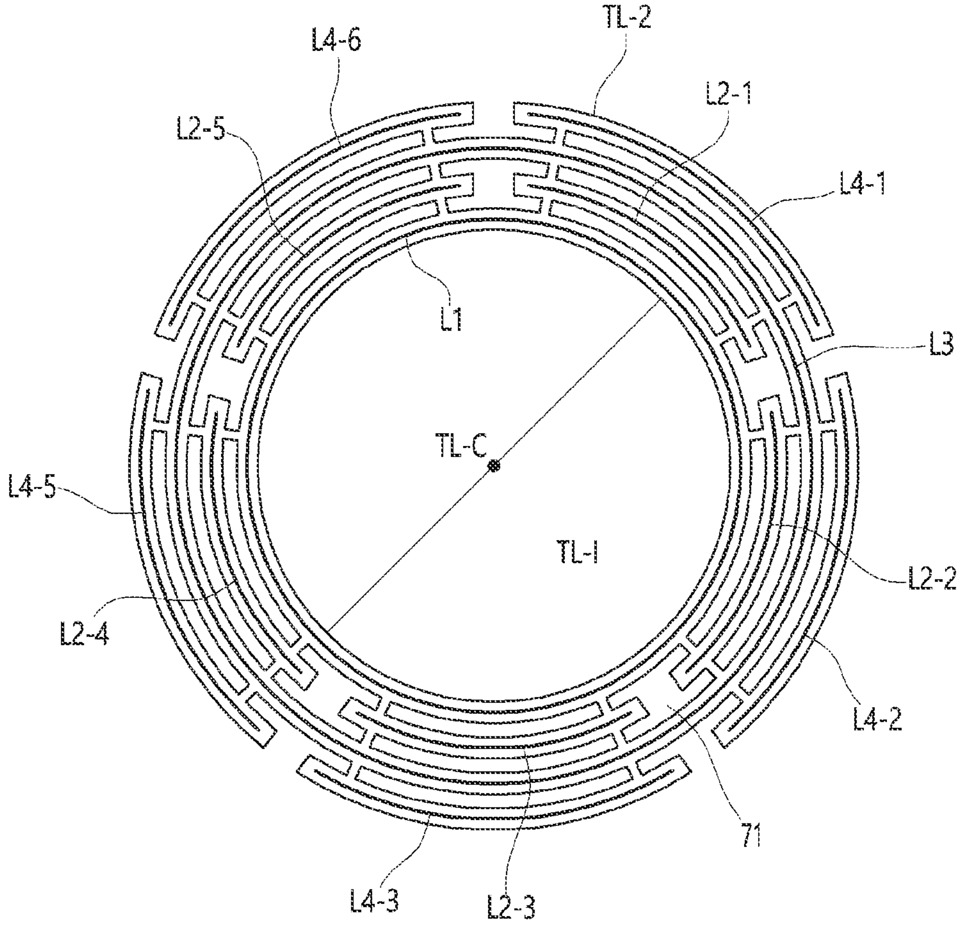

As another embodiment, referring to FIG. 11, the second thin film TL-2 according to the present disclosure may include one or more closed loops L1 and L3 and one or more open loops L2 and L4. The second thin film TL-2 may include a closed loop L1 having a first diameter, an open loop L2 having a second diameter greater than the first diameter, a closed loop L3 having a third diameter greater than the second diameter, and an open loop L4 having a fourth diameter greater than the third diameter and may have a shape in which the loops are connected to each other.

In addition, the open loop L2 having the second diameter may include a plurality of open loop parts L2-1, L2-2, L2-3, L2-4, and L2-5, and the open loop L4 having the fourth diameter may include a plurality of open loop parts L4-1, L4-2, L4-3, L4-4, L4-5, and L4-6.

That is, the second thin film TL-2 may have a shape that optimizes heating characteristics of the object to be heated HO, which is a metal nonmagnetic material, and may have a shape in which the open loop and the closed loop are combined with each other. In addition, the open loop may be constituted by the plurality of open loop parts to minimize induction of a magnetic field.

Figure 12:
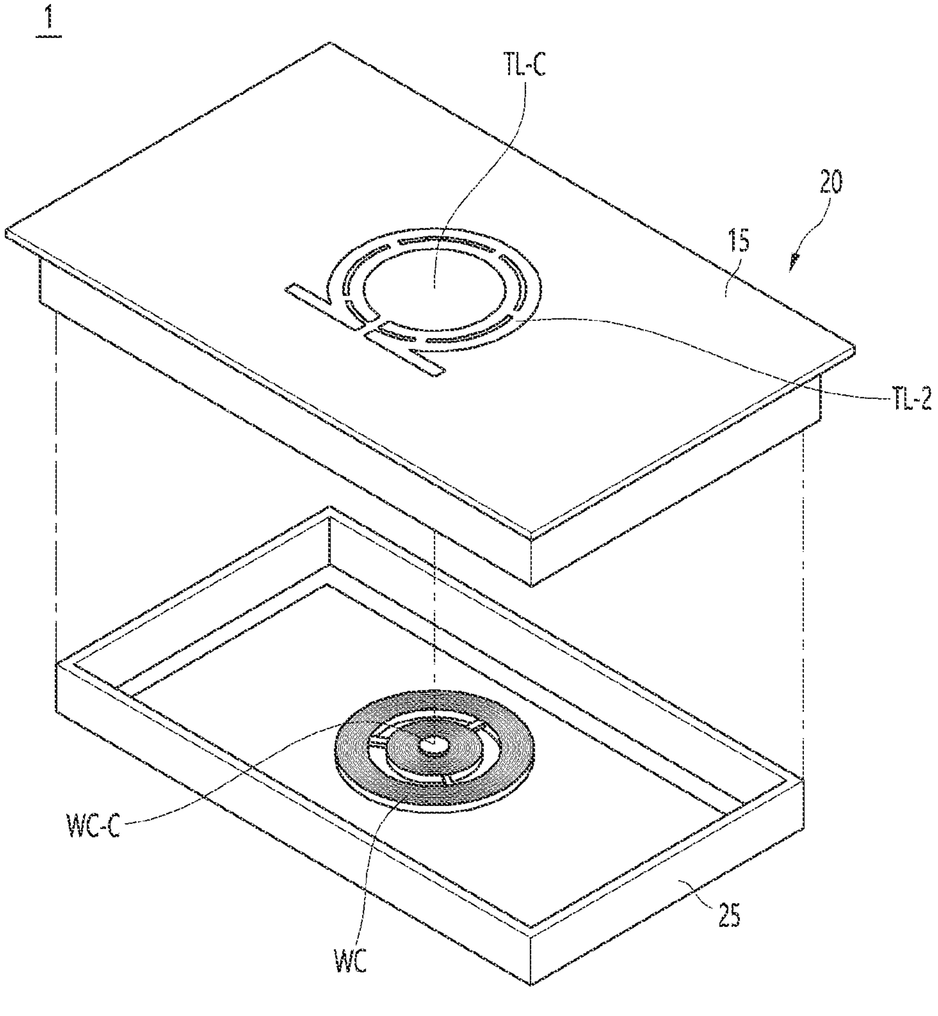
FIG. 12 is a view illustrating a shape of a thin film according to a third embodiment of the present disclosure.

FIG. 12 is a view illustrating the induction heating type cooktop including the second thin film on the upper plate according to the present disclosure.

In FIG. 12, a case in which a shape of the second thin film TL-2 is illustrated as that in FIG. 7 is illustrated as an example, but it is mere an example and is not limited thereto.

As illustrated in FIG. 12, the center TL-C of the second thin film TL-2 according to the present disclosure may be disposed on the center WC-C of the working coil WC in the vertical direction, and the second thin film TL-2 may be disposed on the top surface of the upper plate 15.

The second thin film TL-2 may be detachable from the upper plate 15. Thus, the second thin film TL-2 may be disposed on the upper plate 15 and used only when the object to be heated HO is the nonmagnetic metal.

Next, the heating efficiency according to the material of the object to be heated HO of the induction heating type cooktop 1 according to the present disclosure will be described with reference to FIG. 13.

Figure 13:
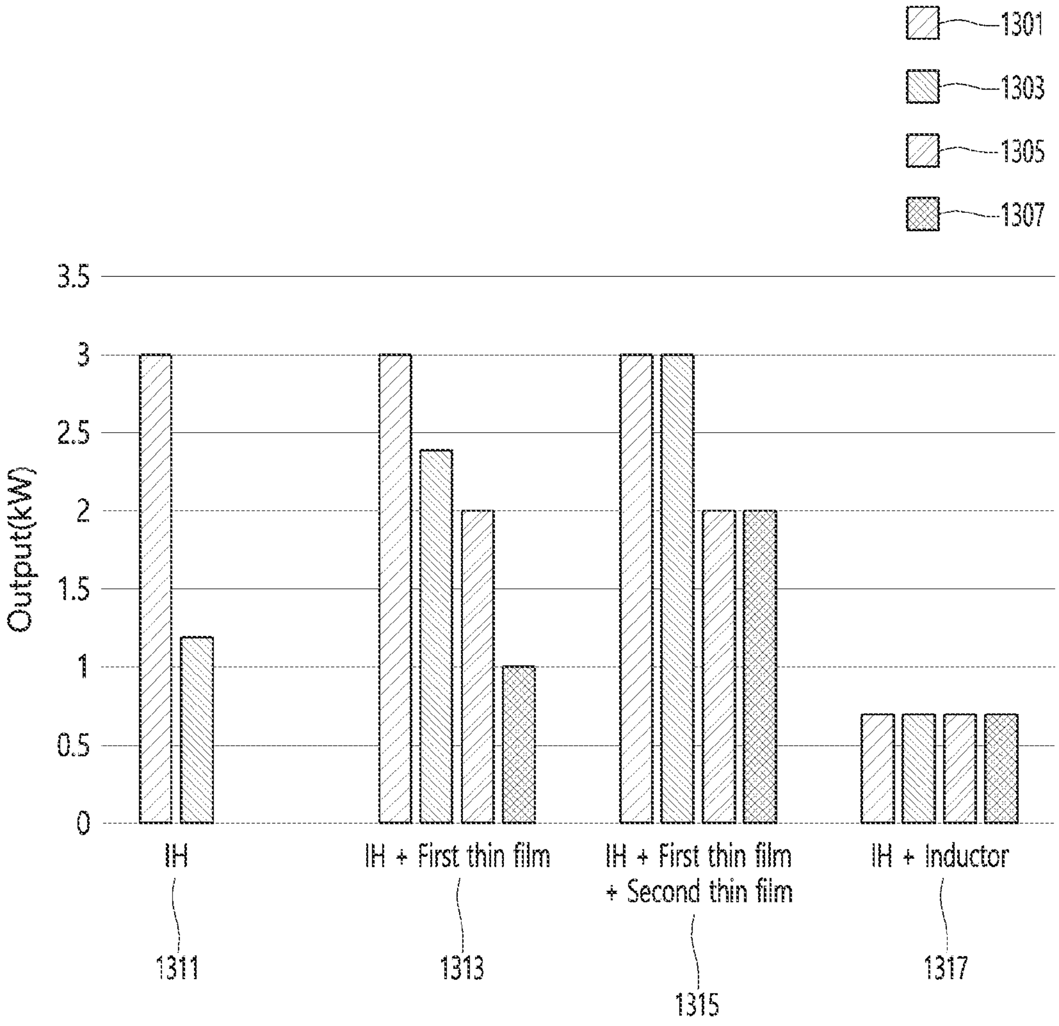
FIG. 13 is a graph illustrating heating efficiency of the induction heating type cooktop according to the present disclosure.

FIG. 13 is a graph illustrating the heating efficiency of the induction heating type cooktop according to the present disclosure.

In FIG. 13, a first bar graph 1301 indicates heating efficiency when the object HO to be heated is a metal ferromagnetic material, a second bar graph 1303 indicates heating efficiency when the object HO to be heated is a first metal nonmagnetic material, a third bar graph 1305 indicates heating efficiency when the object to be heated HO is a non-metallic nonmagnetic material, and a fourth bar graph 1307 indicates heating efficiency when the object HO to be heated is a second metal nonmagnetic material.

In addition, in order from a left side of the graph, an IH 1311 indicates heating efficiency for each characteristic of the object HO to be heated in the existing induction heating type cooktop 1, which does not include the first thin film TL-1 and the second thin film TL-2. An IH+first thin film 1313 indicates heating efficiency for each characteristic of the object HO to be heated when the induction heating type cooktop 1 according to the present disclosure includes the first thin film TL-1. An IH+first thin film+second thin film 1315 indicates heating efficiency for each characteristic of the object HO to be heated when the induction heating type cooktop 1 according to the present disclosure includes the first thin film TL-1 on the bottom surface of the upper plate 15 and the second thin film TL-2 on the top surface of the upper plate 15. An IH+inductor 1317 indicates heating efficiency for each characteristic of the object HO to be heated when a plate made of a metal ferromagnetic material and having a shape different from that of the second thin film TL-2 according to the present disclosure is provided on the top surface of the upper plate 15 in the existing induction heating type cooktop 1. A plate made of the ferromagnetic metal and having a shape different from that of the second thin film TL-2 according to the present disclosure may mean a circular plate including the central area of the working coil WC, i.e., a circular plate having a filled central portion.

Referring to FIG. 13, in the existing induction heating type cooktop (IH, 1311), it is seen that if the object to be heated HO is the metal ferromagnetic material, an output is 3 [kW], if the object to be heated HO is the first metal nonmagnetic material, an output is 1.25 [kW], and if the object to be heated HO is the non-metal nonmagnetic material and the second metal nonmagnetic material, there is no output. That is, in the existing induction heating type cooktop IH, it is seen that the heating efficiency is high only in the case of the metal ferromagnetic material, and the heating efficiency is low in the case of the first metal nonmagnetic material, and also, the containers made of the non-metal nonmagnetic material and the second metal non-magnetic material are not heated.

The first metal nonmagnetic material may refer to a nonmagnetic material having a degree of magnetization in an induced magnetic field, which is greater than that of the second metal nonmagnetic material.

In addition, in an embodiment (IH+first thin film, 1313) in which the first thin film TL-1 is additionally provided in the induction heating type cooktop 1, it is seen that if the object HO to be heated is the metal ferromagnetic material 1301, an output is 3 [kW], if the object HO to be heated is the first metal nonmagnetic material 1303, an output is 2.4 [kW], if the object HO to be heated is the non-metal nonmagnetic material 1305, an output is 2 [kW], and if the object HO to be heated is the second metal nonmagnetic material 1307, an output is 1 [kW]. That is, when the first thin film TL-1 is provided in the induction heating type cooktop 1, it is seen that, in the case of the metal ferromagnetic material 1301, the heating efficiency is the same as the existing case, in the case of the first metal nonmagnetic material 1303, the heating efficiency increases, and in the case of non-metal nonmagnetic material 1305 and the second metal nonmagnetic material 1307, the containers are heated. However, in the case of the second metal nonmagnetic material 1307, it is seen that the heating efficiency is not good compared to other containers.

In an embodiment (IH+first thin film+second thin film, 1315) in which the first thin film TL-1 and the second thin film TL-2 are additionally provided in the induction heating type cooktop 1, it is seen that if the object HO to be heated is the metal ferromagnetic material 1301, an output is 3 [kW], if the object HO to be heated is the first metal nonmagnetic material 1303, an output is also 3 [kW], and if the object HO to be heated is the non-metal nonmagnetic material 1305 and the second metal nonmagnetic material 1307, an output is 2 [kW]. That is, when the first thin film TL-1 and the second thin film TL-2 are provided in the induction heating type cooktop 1, it is seen that if the object to be heated HO is the metal nonmagnetic materials 1303 and 1307, the heating efficiency is improved compared to that case in which only the first thin film TL-1 is provided.

In addition, in the embodiment (IH+inductor, 1317) in which an inductor is provided in the induction heating type cooktop 1, it is seen that the heating efficiency for all kinds of objects HO to be heated is deteriorated. This may mean that the heating efficiency is deteriorated in all the heating containers because the inductor is a circular ferromagnetic plate in which the center is filled.

Therefore, in FIG. 13, it is seen that the heating efficiency of the first metal nonmagnetic material (e.g., stainless 304) and the second metal nonmagnetic material (e.g., aluminum) is improved by the material, the shape, the thickness, and the arrangement of the second thin film TL-2 according to the present disclosure.

As described above, the induction heating type cooktop 1 according to the embodiment of the present disclosure may heat both the magnetic material and the nonmagnetic material, regardless of the arrangement position and type of the object HO to be heated HO. Thus, the user may place the object to be heated on any heating area on the upper plate 15 without needing to determine whether the object HO is the magnetic material or the nonmagnetic material, thereby improving ease of use.

In addition, since the induction heating type cooktop 1 according to an embodiment of the present disclosure directly or indirectly heats the object to be heated using the same heating source, the heating efficiency may be improved, and also, the material costs may be reduced.

The above description is merely illustrative of the technical spirit of the present disclosure, and various modifications and variations will be possible without departing from the essential characteristics of the present disclosure by those of ordinary skill in the art to which the present disclosure pertains.

Accordingly, the embodiments disclosed in the present disclosure are for explanation rather than limiting the technical spirit of the present disclosure, and the scope of the technical spirit of the present disclosure is not limited by these embodiments.

The protection scope of the present disclosure should be interpreted by the following claims, and all technical ideas within the scope equivalent thereto should be construed as being included in the scope of the present disclosure.

The invention claimed is:

1. An induction cooktop comprising:
- a case;
- an upper plate coupled to an upper end of the case and configured to support an object to be heated;
- a working coil disposed inside the case;
- a thermal insulation material disposed between the upper plate and the working coil;
- a first thin film disposed at a bottom surface of the upper plate and configured to be inductively heated by the working coil; and
- a second thin film disposed at a top surface of the upper plate and configured to be in contact with the object,
- wherein the second thin film comprises a plurality of circular open loops that are concentric,
- wherein each of the plurality of circular open loops has a disconnected circumference, and
- wherein the plurality of circular open loops are connected to one another.

2. The induction cooktop according to claim 1, wherein the second thin film defines at least one circular open loop that has an empty center portion and a disconnected circumference.

3. The induction cooktop according to claim 2, wherein the second thin film comprises a ferromagnetic material.

4. The induction cooktop according to claim 1, wherein the upper plate is disposed between the first thin film and the second thin film in a vertical direction, and
- wherein the first thin film and the second thin film overlap with each other along the vertical direction.

5. The induction cooktop according to claim 4, wherein the first thin film and the second thin film overlap with the working coil along the vertical direction.

6. The induction cooktop according to claim 1, wherein the second thin film is configured to be detached from the upper plate.

7. The induction cooktop according to claim 1, wherein the working coil is configured to, based on the object being a metal nonmagnetic object in contact with the second thin film, heat the metal nonmagnetic object via induction.

8. The induction cooktop according to claim 7, wherein the first thin film is configured to heat the metal nonmagnetic object via heat convection or heat conduction.

9. The induction cooktop according to claim 1, wherein the plurality of circular open loops comprise:
- a first open loop that defines a first circumference having a first disconnected portion; and
- a second open loop that is disposed radially outside the first open loop and defines a second circumference surrounding the first circumference, the second circumference having a second disconnected portion.

10. The induction cooktop according to claim 9, wherein the first disconnected portion and the second disconnected portion extend in a radial direction and face each other.

11. The induction cooktop according to claim 10, wherein the first disconnected portion defines at least one slit extending along the first circumference.

12. The induction cooktop according to claim 11, wherein the first disconnected portion and the second disconnected portion are connected to each other in the radial direction, and
- wherein the at least one slit extends in a circumferential direction from a radial position between the first disconnected portion and the second disconnected portion.

13. The induction cooktop according to claim 10, wherein the first disconnected portion defines a plurality of slits that are spaced apart from one another and extend along the first circumference.

14. The induction cooktop according to claim 13, wherein at least one of the plurality of slits extends in a circumferential direction from a position between the first disconnected portion and the second disconnected portion.

15. The induction cooktop according to claim 9, wherein the first disconnected portion is open in a first direction with respect to a center of the plurality of circular open loops, and wherein the second disconnected portion is open in the first direction.

16. The induction cooktop according to claim 9, wherein the first disconnected portion is open in a first direction with respect to a center of the plurality of circular open loops, and wherein the second disconnected portion is open in a second direction opposite to the first direction with respect to the center of the plurality of circular open loops.

17. The induction cooktop according to claim 9, wherein the plurality of circular open loops further comprise a third open loop that is disposed radially outside the second open loop and defines a third circumference surrounding the second circumference, the third circumference having a third disconnected portion.

18. The induction cooktop according to claim 17, wherein the first disconnected portion and the third disconnected portion are open in a first direction with respect to a center of the plurality of circular open loops, wherein the second disconnected portion is open in a second direction opposite to the first direction with respect to the center of the plurality of circular open loops, and wherein the second open loop extends in a circumferential direction and separates the first disconnected portion and the third disconnected portion from each other, and wherein the first open loop and the third open loop extend in the circumferential direction and cover the second disconnected portion.

* * * * *